(No Model.)

P. E. LAW.
CAR FENDER.

No. 564,827. Patented July 28, 1896.

WITNESSES:

INVENTOR
P. E. Law
BY
Munn & Co.
ATTORNEYS.

UNITED STATES PATENT OFFICE.

PRENTIS EVERITT LAW, OF SANTA BARBARA, CALIFORNIA.

CAR-FENDER.

SPECIFICATION forming part of Letters Patent No. 564,827, dated July 28, 1896.

Application filed November 1, 1895. Serial No. 567,592. (No model.)

*To all whom it may concern:*

Be it known that I, PRENTIS EVERITT LAW, of Santa Barbara, in the county of Santa Barbara and State of California, have invented certain new and useful Improvements in Car-Fenders, of which the following is a full, clear, and exact description.

This invention relates to that class of devices commonly known as "car-fenders," adapted for attachment to street-railway cars and the like to prevent the maiming and killing of persons struck by the cars; and the object of the invention is to provide a device of this character of a simple and inexpensive construction, adapted for attachment to street-railway cars of all kinds in position to receive persons on the track and push them laterally out of the path of the car, the construction being such that a softened or yielding blow will be delivered by the fender on contact with a person or obstruction on the track.

The invention consists in a truck-frame supported on the car and movable along the track, being adapted for lateral and vertical movement to enable it to accommodate itself to curves and inequalities in the track, and a fender carried on said truck in position to contact with obstructions on the track and move the same laterally out of the path of the car.

The invention also contemplates certain novel features of the construction and combination and arrangement of the various parts of the device, whereby certain important advantages are attained and the device is made simpler, stronger, cheaper, and more certain in its action, and is otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in both the figures.

Figure 1:
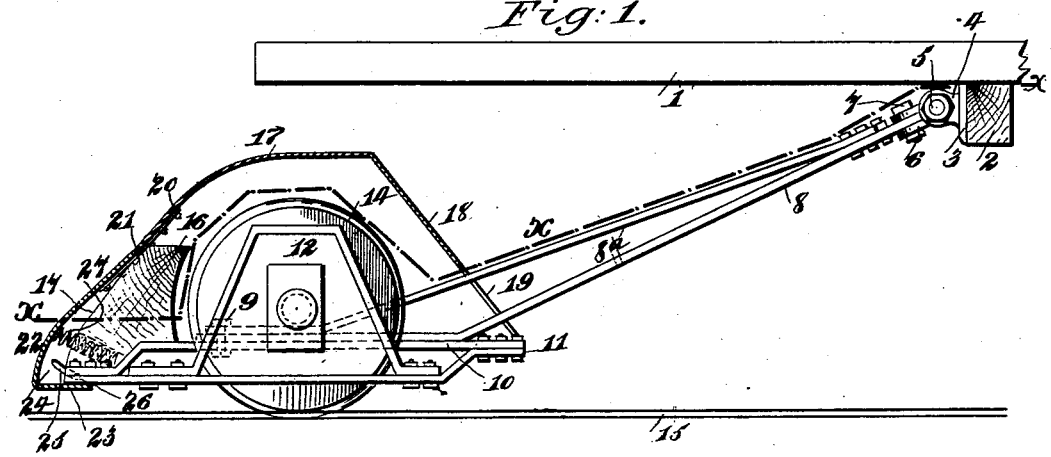
Figure 2:
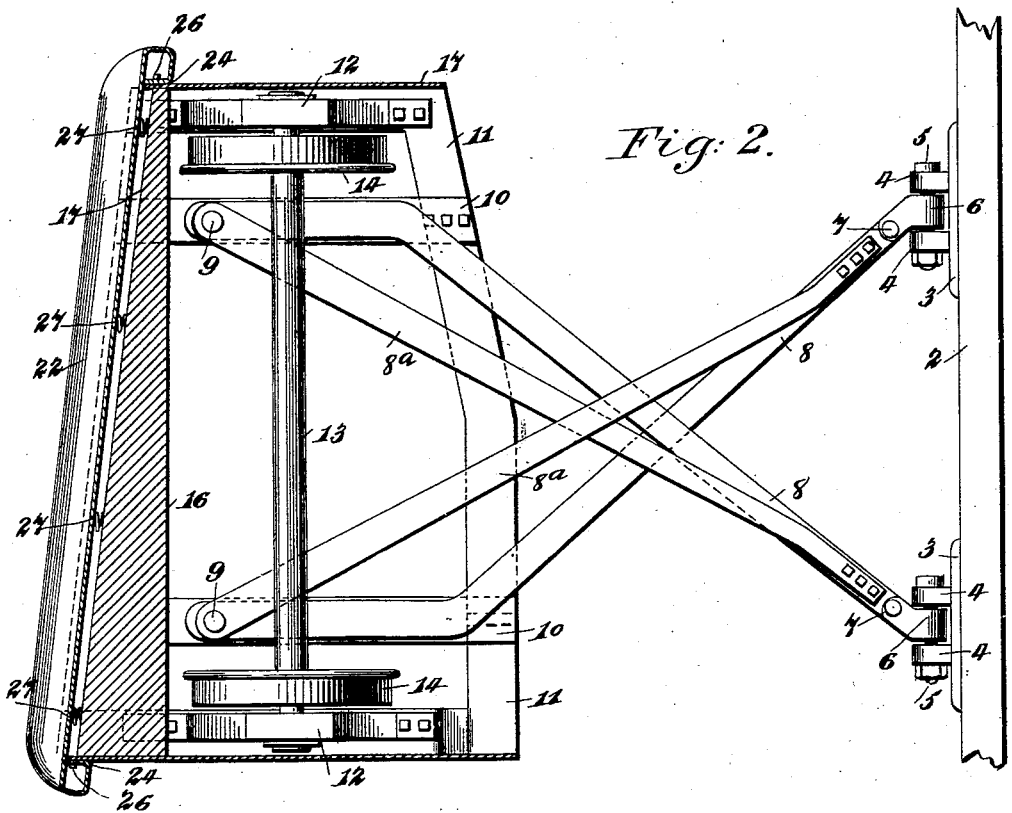

Figure 1 is a longitudinal section taken vertically through the car-fender constructed according to my invention, and showing the same applied to the platform of a car in position for use; and Fig. 2 is a plan view of the fender constructed according to my invention, the forward portion thereof being shown in section in the plane indicated by the line $x\ x$ in Fig. 1.

In the views, 1 represents the car-platform, and 2 represents a transverse beam secured under the same in any desired position, and having brackets 3 secured to its opposite ends, each of said brackets having lugs 4 4, spaced apart and perforated to receive a bolt 5, whereon is pivotally held a clip 6, having pivoted to its front part on a pivot-pin 7, at right angles to the bolt 5, a rod or bar 8.

The rods 8, pivoted at opposite sides of the car, are bent or crossed over each other and are provided with braces $8^a$, and the forward ends of said rods and braces are pivoted, as seen at 9, to the bars 10, extending across the open frame 11 of the fender, herein shown as composed of flat metal bars or rods of a general rectangular form. The fender-frame 11 extends transversely of the track and is provided at opposite ends with upwardly-extending brackets or pedestals 12, wherein is journaled an axle 13, having wheels 14 to run on the car-track 15, and along the forward face of the fender-frame is arranged a beam 16, of suitable strength and proportions, formed by preference of wood and having its forward edge inclined to the path of the car, as indicated in Fig. 2.

A covering 17, which may be formed of sheet metal, netting, or other material, extends over the fender-frame from the upper edge of the beam 16 rearward, being inclined at its rear part, as indicated at 18, and apertured, as seen at 19, for the passage of the rods 8 and $8^a$, and to the depending front edge 20 of said covering is hinged, by means of hinges 21, a buffer 22, the lower portion 23 of which is bent over rearward under the beam 16, the ends 24 thereof being also bent rearward outside the ends of the beam and having slots 25, curved concentric with the hinge-pivot 21 and adapted to receive pins 26 on the ends of the beam 16 to guide the said buffer in its movements.

The front face of the buffer 22 is inclined similarly to the front face of the beam 16 and is normally held pressed forward by springs 27, held on the said beam 16. Said buffer is adapted, on contact with a person or obstruction on the track, to be moved rearward and down close upon the track, so as to compress the springs 27 and break the force of the blow, and when so moved the obstruction will, by reason of the inclination of the said buffer, be forced sidewise off the track. Chains will be provided to prevent too great lateral movement of the fender.

The device, as above described, is of an extremely simple, inexpensive, and compact construction, and is especially well adapted for use on street-railway cars, since it is adapted to stand close to the track and follow the curves of the same, owing to the construction and arrangement of the rods 8 and 8ª.

Moreover, it will be obvious from the above description of my improved car-fender that the same is susceptible of considerable modification without material departure from the principles and spirit of my invention, and for this reason I do not wish to be understood as limiting myself to the exact form of the parts herein set forth in carrying my invention out in practice.

Having thus described my invention, I claim as new and desire to secure by Letters Patent—

1. In a car-fender, the combination of a car, rods pivoted to opposite sides thereof and capable of vertical and longitudinal movement, a fender-frame connected to said rods, wheels on the fender-frame to run on the car-tracks, a buffer carried on the fender-frame and having its front end formed with a straight surface adapted to contact with an obstruction on the track, said surface being inclined from end to end to the path in which the car moves, and springs connecting the buffer with the fender-frame, substantially as set forth.

2. In a car-fender, the combination with the car having brackets at opposite sides, of clips pivoted on said brackets and swinging in vertical planes, rods pivoted to said clips and swinging in horizontal planes, a fender-frame connected to the forward ends of the rods, and wheels on said fender-frame to engage the car-tracks, substantially as set forth.

3. In a car-fender, the combination with the car having brackets at opposite sides, spaced and perforated lugs on the brackets, and bolts passed through the perforated lugs of each bracket, of clips pivoted to said bolts and swinging in vertical planes, rods pivoted to the clips and swinging in horizontal planes, a fender-frame connected to the forward end of the rods, and wheels on said fender-frame to engage the car-tracks, substantially as set forth.

4. A car-fender, comprising a fender-frame having wheels to run on the car-tracks, a buffer having its upper edge pivoted at the forward part of the fender-frame and having its lower edge and end portions bent to overlap the bottom and ends of the said fender-frame, said bent ends of the buffer being slotted, pins on the fender-frame engaging said slots and springs on the fender-frame behind the buffer and holding the same normally pressed forward, substantially as set forth.

PRENTIS EVERITT LAW.

Witnesses:
S. L. LAW,
LAWCE. J. GIRVIN.